US009569199B2

(12) United States Patent
Wang et al.

(10) Patent No.: US 9,569,199 B2
(45) Date of Patent: Feb. 14, 2017

(54) SYSTEMS AND METHODS TO UPDATE SOURCE CODE FILES (71) Applicant: Futurewei Technologies, Inc., Plano, TX (US)

(72) Inventors: Haichuan Wang, Champaign, IL (US); Handong Ye, Union City, CA (US); Peng Wu, Rochester, NY (US)

(73) Assignee: Futurewei Technologies, Inc., Plano, TX (US)

( * ) Notice: Subject to any disclaimer, the term of this patent is extended or adjusted under 35 U.S.C. 154(b) by 197 days.

(21) Appl. No.: 14/603,136

(22) Filed: Jan. 22, 2015

(65) Prior Publication Data

US 2016/0216962 A1 Jul. 28, 2016

(51) Int. Cl.
*G06F 9/45* (2006.01)
*G06F 9/44* (2006.01)
(Continued)

(52) U.S. Cl.
CPC . *G06F 8/67* (2013.01); *G06F 8/71* (2013.01); *G06F 9/4856* (2013.01);
(Continued)

(58) Field of Classification Search
CPC ...... G06F 11/3644; G06F 9/4443; G06F 9/32; G06F 9/4856; G06F 9/4426; G06F 8/67; G06F 8/68; G06F 8/65
See application file for complete search history.

(56) References Cited

U.S. PATENT DOCUMENTS 8,468,516 B1 * 6/2013 Chen .................. G06F 8/67
707/687
8,607,208 B1 * 12/2013 Arnold ................ G06F 8/67
717/129
(Continued)

FOREIGN PATENT DOCUMENTS

| CN | 103309683 A | 9/2013 |
| CN | 103559449 A | 2/2014 |
| CN | 103984582 A | 8/2014 |

OTHER PUBLICATIONS

Haibo Chen et al., Live Updating Operating Systems Using Virtualization, ACM Jun. 14-16, 2006, [Retrieved on Mar. 14, 2016]. Retrieved from the internet: <URL: http://dl.acm.org/citation.cfm?id=1134767> 10 Pages (35-44).*

(Continued)

*Primary Examiner* — Thuy Dao
*Assistant Examiner* — Anibal Rivera
(74) *Attorney, Agent, or Firm* — Schwegman Lundberg & Woessner, P.A.

(57) ABSTRACT

Methods and systems that facilitate efficient and effective application program maintenance and patch distribution are described. A device comprises: a memory that stores application source code files and instructions for creating a hot patch file, wherein the application source code files include an update source code file and initial source code files before an application update; and a processor operable to create the hot patch file, wherein the hot patch file is created based upon differences between a pair of optimized source code file sets that result from optimization of a first set of the initial source code files and separate optimization of a second set of source code files; wherein the second set includes an update source code file and associated files selected from the first set based on results from a graph (Continued)

indicating manners in which said source code files related to one another.

8 Claims, 7 Drawing Sheets

(51) Int. Cl.
<table>
<tr><td>G06F 3/00</td><td>(2006.01)</td></tr>
<tr><td>G06F 9/445</td><td>(2006.01)</td></tr>
<tr><td>G06F 17/30</td><td>(2006.01)</td></tr>
<tr><td>G06F 9/48</td><td>(2006.01)</td></tr>
<tr><td>G06F 9/32</td><td>(2006.01)</td></tr>
<tr><td>G06F 11/36</td><td>(2006.01)</td></tr>
</table>

(52) U.S. Cl.
CPC .......... *G06F 17/30106* (2013.01); *G06F 9/32* (2013.01); *G06F 9/4443* (2013.01); *G06F 11/3644* (2013.01)

(56) References Cited

U.S. PATENT DOCUMENTS

| | | | | |
|---|---|---|---|---|
| 2004/0107416 A1* | 6/2004 | Buban | ................... | G06F 8/68 717/170 |
| 2005/0257205 A1* | 11/2005 | Costea | ................... | G06F 8/65 717/168 |
| 2006/0010435 A1* | 1/2006 | Jhanwar | ................... | G06F 8/65 717/168 |
| 2006/0294498 A1* | 12/2006 | Partamian | ................... | G06F 8/67 717/106 |
| 2007/0214461 A1* | 9/2007 | Glatron | ................... | G06F 9/4426 719/321 |
| 2007/0291038 A1* | 12/2007 | Herz | ................... | G06F 9/4443 345/501 |
| 2009/0313611 A1* | 12/2009 | Panchamukhi | ................... | G06F 9/32 717/129 |
| 2010/0083224 A1 | 4/2010 | Arnold | | |
| 2012/0005646 A1* | 1/2012 | Manglik | ................... | G06F 9/4856 717/105 |
| 2013/0283252 A1 | 10/2013 | Mannarswamy et al. | | |
| 2014/0229921 A1* | 8/2014 | Arora | ................... | G06F 11/3644 717/125 |
| 2014/0317731 A1* | 10/2014 | Ionescu | ................... | G06F 21/54 726/22 |
| 2015/0355898 A1 | 12/2015 | Zhang et al. | | |

OTHER PUBLICATIONS

Alexey Smirnov et al., Automatic Patch Generation for Buffer Overflow Attacks, IEEE 2007, [Retrieved on Mar. 14, 2016]. Retrieved from the internet: <URL: http://ieeexplore.ieee.org/stamp/stamp.jsp?tp=&arnumber=4299769> 6 pages (165-170).*

"International Application Serial No. PCT/CN2016/071485, International Search Report mailed Apr. 25, 2016", 6 pgs.

"International Application Serial No. PCT/CN2016/071485, Written Opinion mailed Apr. 25, 2016", 5 pgs.

"Partial Machine Translation of CN 103559449A, published Feb. 5, 2014", 11 pgs.

* cited by examiner

Executing a first pre-compile optimization on a plurality of original source code files, wherein in the result is a plurality of pre-optimized original source code files.

720

Accessing an initial patch file associated with a change to one of the original source code files.

730

Determining if another one of the plurality of original source code files is associated with the initial patch file.

740

Executing a second pre-compile optimization on the initial patch file and the other one of the plurality of original source code files, wherein the result is a plurality of pre-optimized patch-associated source code files.

750

Comparing the plurality of pre-optimized patch-associated source code files and the corresponding plurality of pre-optimized original source code files and identifying a new hot patch file, wherein the new hot patch file includes a file of the plurality of pre-optimized patch-associated source code files that is different from a corresponding file of the plurality of pre-optimized original source code files.

FIG 7

SYSTEMS AND METHODS TO UPDATE SOURCE CODE FILES

TECHNICAL FIELD

The present disclosure relates generally to the field of updating source code files in a computer programming language.

BACKGROUND

Numerous electronic technologies such as digital computers, calculators, audio devices, video equipment, and telephone systems facilitate increased productivity and reduce costs in analyzing and communicating data in most areas of business, science, education and entertainment. Frequently, these activities involve computer programming and source code processing. Maintaining and updating the source code files can be complex and tedious.

Source code files are typically either dynamic or static and each has various advantages and disadvantages. Static type source code executes relatively fast during runtime, however is relatively difficult to maintain and update. Dynamic type source code is easy to maintain and update, but runs relatively slow As a practical matter, various pre-compile optimization is performed on the dynamic type source code to help it run faster. However, conventional approaches to pre-compile optimization introduce complexities that basically eliminate many of the advantages of dynamic type source code related to maintenance and updating.

One important feature of dynamic scripting language is that the code can be directly executed by the interpreter and no compilation process is required. This feature facilitates simplification of the hot patch processes. In effect, if the dynamic source code is not pre-compile optimized and there is a bug or programming defect in one source code file of an application's numerous files, the application maintainer can merely replace the original source code file corresponding to the bug with a patch or fixed source code file and reload it in the language interpreter (the other numerous source code files are untouched during the patching). However, when pre-compile optimization is used to overcome slow dynamic code, the pre-compile optimization can introduce challenges to traditional hot patch process attempts. In one conventional example, a first FILE1 defines a constant ABC=100 and a second file FILE2 uses the ABC constant in an operation K=ABC+25. Performing a conventional pre-compile optimization (e.g., constant propagation optimization) replaces ABC in FILE2 with 100 and the optimized file is K=125. However, if there is a change in FILE1 (e.g., defining ABC=200) and if the maintainer follows conventional hot patch process approaches (only replacing FILE1 and not touching FILE2) then the patch will not fix the problem because there is no corresponding appropriate consideration of the impact on FILE2.

To overcome the complexities and potential problems introduced by pre-compile optimization in dynamic code applications, conventional solutions typically use a whole application scope pre-compilation which replaces all the source code files in the application, and reloads all the source files (e.g. similar to static code approaches). However, these traditional approaches usually give rise to three problems that reduce or eliminate the maintenance and upload advantages otherwise associated with dynamic type source code. The first problem is an increase in the patching workload. Even though the patches are primarily directed to replacing and reloading the fixed files, the conventional approaches require replacing and reloading of all the files globally. The second problem is an increase in the pre-compilation complexity. The global scope of the pre-optimization often requires a long period (e.g., hours, days, etc.) for enterprise applications. In the original hot patch mode, no such step is required. The third problem is loss of the hot patch continuous run features. It's possible that the application maintainer stops the application to reload all files because some files belong to a particular type (e.g., base libraries, boot loaders, etc.) and cannot be replaced without stopping the application.

Dynamic scripting languages, such as JavaScript, Python, PHP, Lua, etc., are widely used in building large applications. Some examples include: Web front end applications (e.g., Google web based tools, like Map, Gmail, Calendar, Docs, etc.); Web back end applications (e.g., Facebook's application with PHP, etc.); gaming industry applications (e.g., Blizzard's World of Warcraft with Lua, etc.) and mobile applications (e.g., Apple's iOS applications with Object-C, etc.). Conventional approaches to maintaining and updating some files of a dynamic scripting language in large applications are typically time and resource intensive.

SUMMARY

Methods and systems that facilitate efficient and effective application program maintenance and patch distribution are described. In one embodiment, a device comprises a memory that stores application source code files and instructions for creating a hot patch file that facilitates an update to the application source code files, wherein the application source code files include an update source code file and initial source code files before the update; and a processor operable to create the hot patch file. The hot patch file is created based upon differences between a pair of optimized source code file sets that result from optimization of a first set of the initial source code files and separate optimization of a second set of source code files. The second set includes an update source code file and associated source code files intelligently selected from the first set, wherein the second set has fewer source code files than the first set. The source code files are dynamic scripting language files. The first set of source code files includes initial source code files before the update.

In one exemplary implementation, the processor creates an impact graph that tracks associations between the initial source code files in the first set and the impact graph is used to identify the associated source code files intelligently selected from the first set. A query of the impact graph regarding the associated initial source code file returns two categories of results including: initial source code files that potentially also change due to a change in the update source code file; and initial source code files that include inputs to the update source code file. A statement included in the update source code file may be different from a statement in the one of the initial source code files, and the a query regarding the statement included in the update source code file is used to query the impact graph regarding associated initial source code files. A portion of the source code files are included in a dynamic module and the initial patch file is associated with the dynamic module. The initial patch file is used for correcting a bug in one of the initial source code files. and the hot patch file includes a change to a first initial source code file and the update source code file includes a modification to another initial source code file.

In one embodiment, a method for updating application files is implemented. A first pre-compile optimization is executed on a plurality of original source code files resulting in a plurality of pre-optimized original source code files. An initial patch file is associated with a change to a first one of the plurality of original source code files, the method includes determining if a second one of the plurality of initial source code files is associated with the initial patch file. The second one of the plurality of original source code files is included in a set of impacted source code files if the second one of the plurality of original source code files is associated with the initial patch file. A second pre-compile optimization is performed on the initial patch file and the set of impacted source code files, wherein the result is a plurality of pre-optimized patch associated source code files. A new hot patch file is created based upon 1) a comparison of the plurality of pre-optimized patch associated source code files and 2) the corresponding plurality of pre-optimized original source code file. A new hot patch file includes one of the plurality of pre-optimized patch associated source code files that is different from a corresponding one of the plurality of pre-optimized original source code files.

In an alternative embodiment, an apparatus comprises: a processor operable to update source code files of an application program that are impacted by a hot patch file, and if the hot patch file is not a bootloader file, continuing to run the application while loading the hot patch file without reloading additional source code files not impacted by the hot patch file. Also included is a memory that stores instructions and information for the processor, the information includes a plurality of files associated with the application including files that are impacted by the hot patch file. The plurality of application files are dynamic scripting language files. The hot patch file and an initial update file are different. The processor replaces one of the plurality of application files with the hot patch file and reloads it in a language interpreter while avoiding compilation of the hot patch file.

It is appreciated that there are various techniques can be used (e.g., constant propagation, dead code elimination, loop invariant code motion, etc.) that produce various different results. There are also various factors that can be considered when deciding on an optimization approach (e.g., processing resources used during optimization, complexity introduced in the optimized runtime files, etc.). The term optimization as used herein is a process that is directed to producing a set of files that give performance improvement over the original source code files based upon certain considerations or criteria (e.g., increase in runtime speed verses complexities introduced by the optimization, etc.) the term optimization is a term tot the computer art for programming and compiling, etcetera, and is used herein for that purpose. The term optimization as used herein is not necessarily being an absolute "optimization" of application runtime speed (e.g., fastest, best, etc.).

BRIEF DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Methods and systems used for computer program development that facilitate efficient and effective application program maintenance and patch distribution are described. In one embodiment, optimized dynamic scripting files are updated or "patched" with small efficient hot patch files. The hot patch files that are created utilize update impact files to avoid multiple global pre-compile optimization processes. In a runtime environment, the hot patch files facilitate application operation continuation while minimizing the need to reload source code files not impacted by the hot patch file. The updates or patches are compatible with a variety of application maintenance environments and update environments (e.g., distributed, local, networked, etc.).

Figure 1:
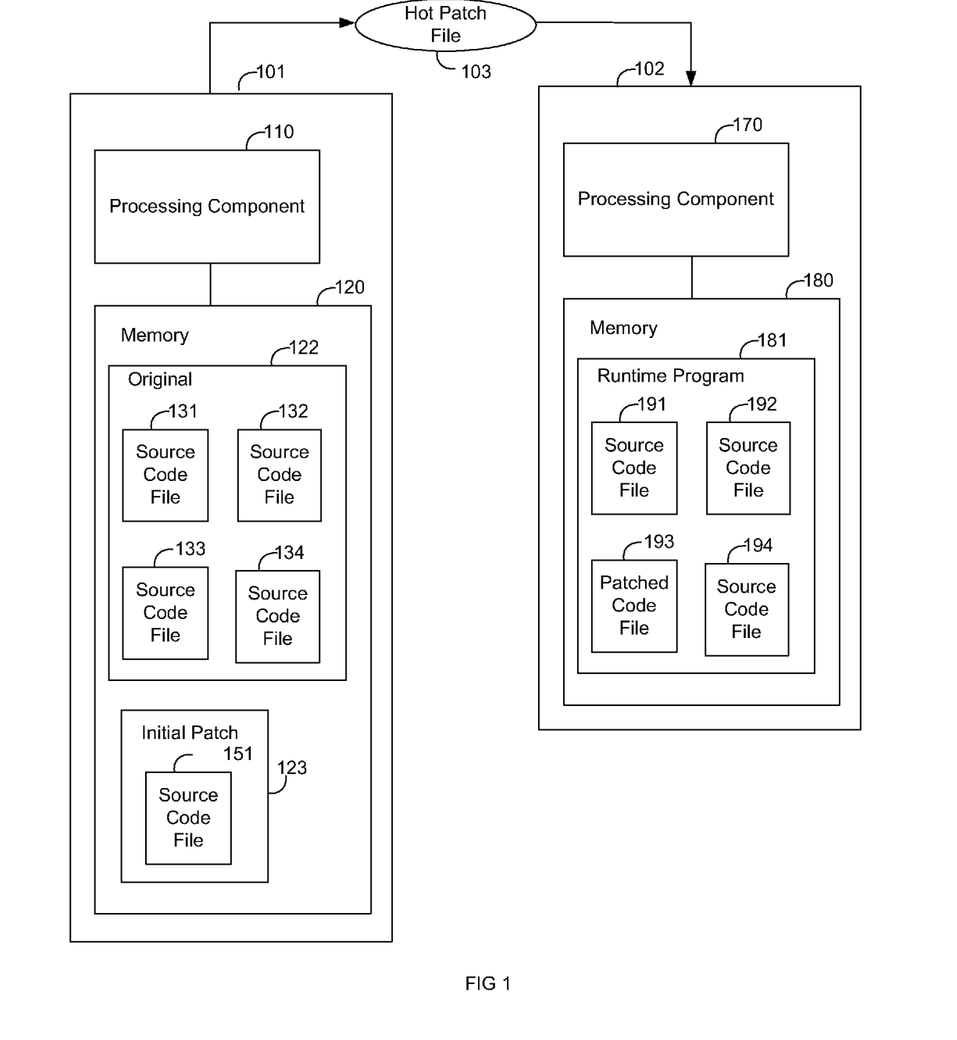
FIG. 1 is a block diagram of an exemplary computer programming environment in accordance with one embodiment of the present invention.

FIG. 1 is a block diagram of an exemplary environment 100 in accordance with one embodiment of the present invention. The environment 100 includes system 101 and system 102. Systems 101 and 102 can be remote from one another. System 101 creates the hot patch file 103 which is forwarded to system 102. System 102 executes an application and uses hot patch file 103 to update files included in the application.

System 101 includes processing component 110 and memory 120. Processing component 110 creates a hot patch file based upon a plurality of original application files and an initial patch file. The initial patch file corresponds to one of the original application files that is being updated. The processing component 110 executes a first optimization on the plurality of original application files to create a first set of optimized files. The original application files that are associated with the initial patch file are identified and updated to reflect changes included in the initial patch file.

The processing component 120 executes a second optimization on resulting updated files to create a second set of optimized files. The first set of optimized files is compared to the second set of files. Files in the second set of files that are different from corresponding files in the first set of files are included in hot patch files.

Processor 110 accesses and utilizes information stored in memory 120. The information includes: the plurality of original application files 122, the initial patch file 123, and instructions for the directing the processor in creation of the hot patch file 103, including identification and updating of the original application files 122 that are impacted by the updates in the initial patch file 123.

The original applications files 122 include source code files 131, 132, 133, and 134. The initial patch file 123 includes source code file 151.

System 102 includes processing component 170 and memory 180. Processing component 170 accesses a hot patch file 103 while running an application. At least one application file is impacted by the hot patch file 103 and the processing component 170 updates the files (e.g., patched code file 193, etc.) that are impacted by the hot patch file 103. If the hot patch file 103 is not a bootloader file, the application is not stopped and files (e.g., source code files 191, 192, 194, etc.) not impacted by the hot patch file 103 are not reloaded. Thus, global pre-optimization and global reloading processes are not required. Processor 170 accesses and utilizes information stored in memory 180. The information includes the plurality of files (e.g., source code files 191, 192, 194, etc.) associated with the application including the files (e.g., patched code file 193, etc.) that are impacted by updates included in the hot patch file 103.

In one exemplary implementation, system 101 can be located at an application vendor and system 102 is located at a remote customer location. The customer runs a vendor supplied application on system 102. The vendor uses system 101 in the creation, distribution and maintenance of the application, including the creation of the hot patch file 103, which is forwarded to the customer to update the application files. The hot patch file can be communicated to the system 102 by various means (e.g., over a network, in a portable computer readable medium such as a compact disk, flash drive, etc.).

It is appreciated that there are various techniques can be used (e.g., constant propagation, dead code elimination, loop invariant code motion, etc.) that produce various different results. There are also various factors that can be considered when deciding on an optimization approach (e.g., processing resources used during optimization, complexity introduced in the optimized runtime files, etc.). The term optimization as used herein is a process that is directed to producing a set of files that give performance improvement over the original source code files based upon certain considerations or criteria (e.g., increase in runtime speed verses complexities introduced by the optimization, etc.) the term optimization is a term tot the computer art for programming and compiling, etcetera, and is used herein for that purpose. The term optimization as used herein is not necessarily being an absolute "optimization" of application runtime speed (e.g., fastest, best, etc.).

In one embodiment, an impact graph is used to identify original application files that are associated with an initial update or patch file. The impact graph is created during optimization of the original or initial source code files. This graph is a direct graph in which a node represents a source code file and an edge represents one optimization's impact, starting from the data source of the optimization and ending at the optimized file. In one example, a first file FILE1 defines a constant ABC=100 and a second file FILE2 uses ABC constant in an operation The constant propagation optimization replaces ABC in FILE2 with 100. In this example, there is an edge from File1 to File2 in the graph.

Figure 2:
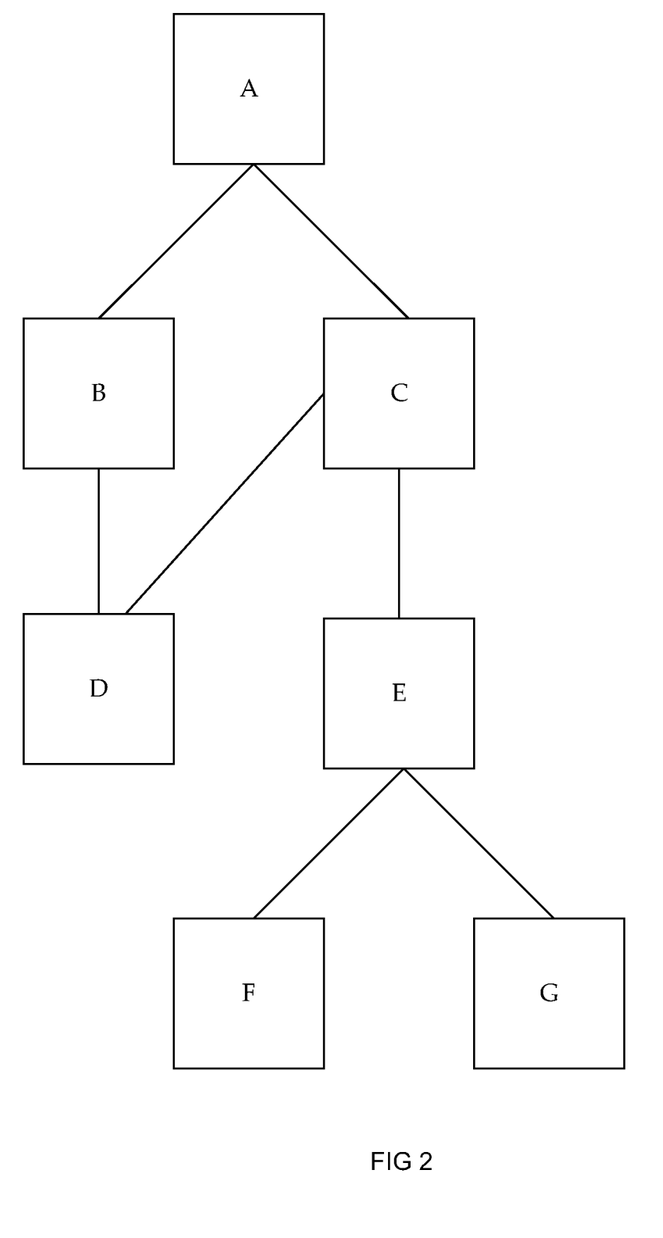
FIG. 2 is an exemplary impact graph in accordance with one embodiment of the present invention.

FIG. 2 is a diagram of an exemplary impact graph in accordance with one embodiment of the present invention. The impact graph includes a plurality of nodes A, B, C, D, E, F, and G corresponding to a plurality of original source code files and each edge of the graph represents an impact in an optimization operation (starting from a data source of the optimization and ending at an optimized file). Node A defines constants for nodes B and C which perform various functions. The output of node A is input to nodes B and C, and the output of nodes B and C are input to node D. The output of node C is also input to node E and the output of node E is input to nodes E and F. During the hot patch phase, if there is an original source code file that is patched or fixed, the graph is used to locate or select related or associated files (e.g., nodes B and C are associated with node D, etc.) and the selected files are used in optimization. The update associated source code files are used in a "small scope" pre-optimization (e.g., smaller in scope or number of source code files than a global optimization performed originally). The selection can cover a variety of different source codes files.

Conventional approaches do not create an impact graph and use it to identify associated files. In one exemplary implementation, a query of the impact graph results in an output including two categories of nodes: nodes of the graph reachable through nodes associated with the patch file, and nodes of the graph that can reach the node associated with the patch file. The first category are files that may be changed due to the modification of the patch file, and the second category are the files that the patch file uses to do pre-compile optimization.

In one embodiment, source code files are included in different categories or sets of source code files. For example, there is a set of initial application files that include source code files created by a user writing program code (e.g., writing program instructions, declarations, statements, functions, etc.) before a patch file is introduced. There is a set of update primary files that include source code files that are created by a user writing changes or updates to the source code files of the initial application set. There is a set of source code files that are the result of compile optimization on the original source code files (also referred to as "pre-optimized" files), and so on.

Figure 3:
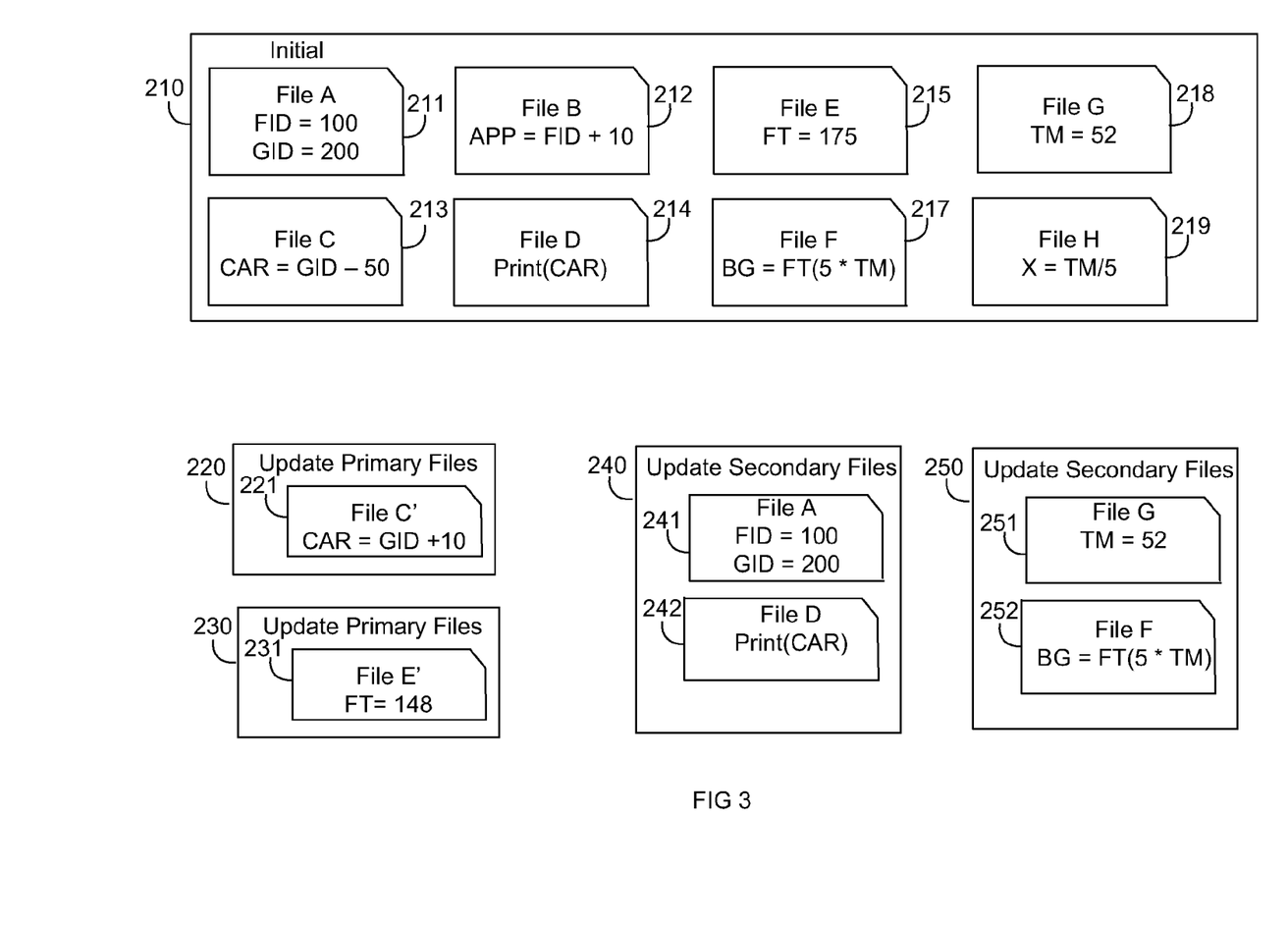
FIG. 3 is a block diagram of exemplary application source code files in accordance with one embodiment of the present invention.

FIG. 3 is a block diagram of exemplary application source code files in accordance with one embodiment of the present invention. The source code files are arranged in various categories or sets. Initial file set 210 includes source code files 211, 212, 213, 214, 215, 216, 217, 218, and 219. Update primary file set 220 includes source code file 221 and update primary file set 230 includes source code file 231. Update secondary file set 240 includes source code files 241 and 242. Update secondary file set 250 includes source code files 251 and 252. The source code files in the different categories or sets can have various operational relationships to one another, including directly corresponding to one another, being indirectly associated with one another, and no operational association with one another. Determining and tracking the relationships of the source code files to one another is important for ensuring that appropriate source code files are updated as a result of a patch.

In one embodiment, a first source code file in the initial file set includes a feature change made by a user (e.g., re-writing an instruction, definition of a constant, etc.) that directly corresponds to a change or update in a feature of an initial patch file. For example, the source code file 213 instruction CAR=GID−50 directly corresponds to an instruction change of source code 221 instruction change and the source code file 215 constant definition FT=175 directly corresponds to the change in source code 231 constant definition FT=148. A second source code file in the initial application file set includes a feature that is indirectly associated with changes in the initial patch file. For example, source code file 211 includes constant definition GID=200 which is not directly changed by the initial patch file 221 but is indirectly associated with the changed instruction CAR=CID+10 in the initial patch file 221. Similarly, source code file 214 includes the instruction Print(CAR) which is not directly changed by the initial patch file 221 but is indirectly associated with the changed instruction CAR=CID+10 in the initial patch file 221 (in that the initial patch file 221 does not "directly" include the PRINT instruction but the change in patch file 221 changes the final print output of the variable CAR by file 214).

In one exemplary implementation, some source code files included in the initial application set (e.g., source code files that are indirectly associated with an initial patch files) are also included in the update secondary file sets. Source code files 241 and 242 included in update secondary set 240 are the same as source code files 211 and 214 in the initial file set 210 and source code files 251 and 252 included in the update secondary set 250 are the same as source code files 218 and 219 in the initial file set 210. It is appreciated that the update secondary file sets can have a variety of configurations. A source code file from the initial set can be directly used by the update secondary file sets or a copy of the update secondary file sets can be used by the update secondary file sets.

In one exemplary implementation, only pre-optimized updated files that change are included in the hot patches and uploaded. Although there may be more impacted files than the input patch files, the scope is typically much smaller than including all the source code files in an application. Due to the small scope of the impacted files, pre-optimization is faster than conventional whole scope pre-optimization. If the updated file does not belong to the bootloader, the impacted files will not belong to the bootloader either, and as a result, the application maintainer can also apply patches without stopping the application.

Figure 4:
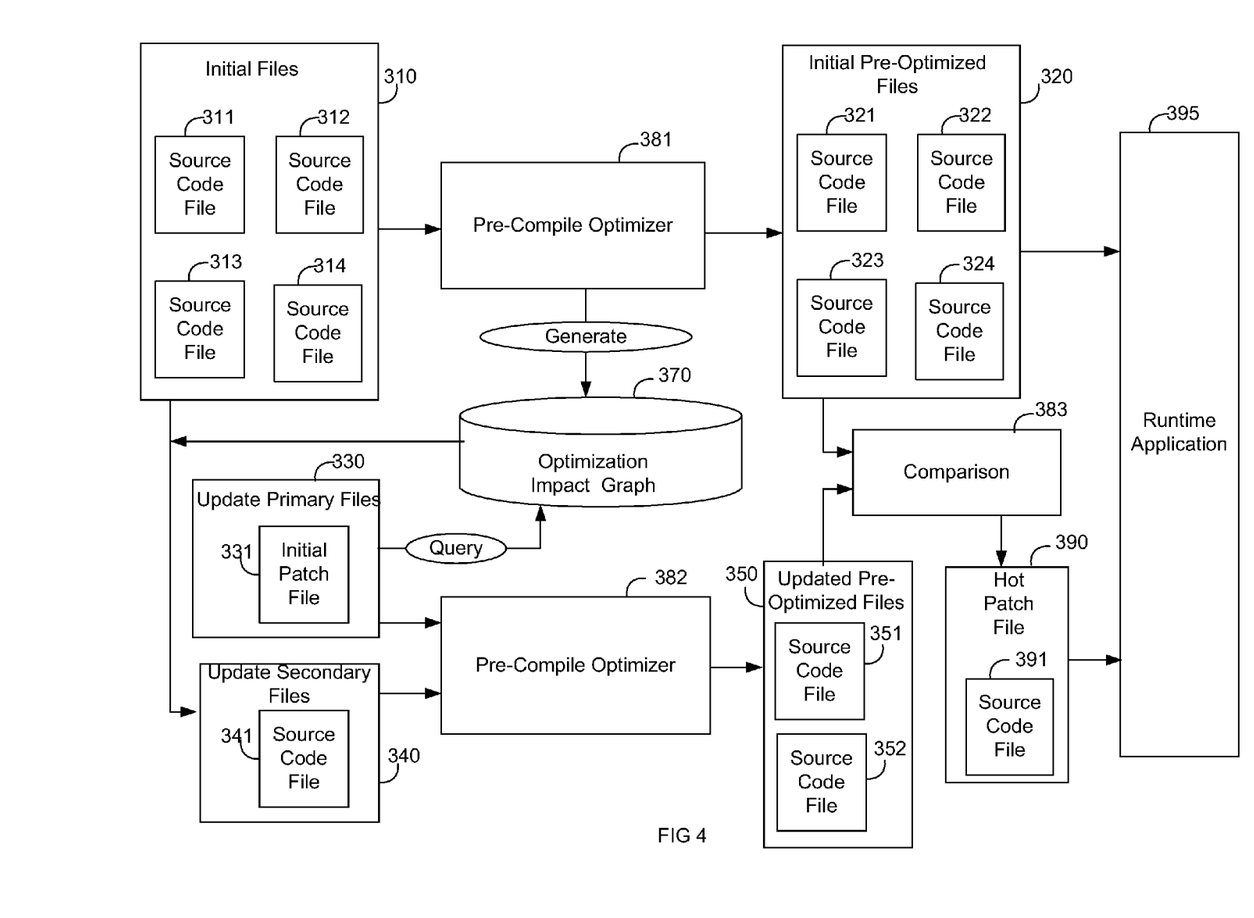
FIG. 4 is a block diagram of an exemplary system architecture in accordance with one embodiment of the present invention.

FIG. 4 is a block diagram of an exemplary architecture in accordance with one embodiment of the present invention. Initial file set 310 (e.g., including source code files 311, 312, 313 and 314) is optimized by pre-compile optimizer 381 resulting in initial pre-optimized file set 320 (e.g., including source code files 321, 322, 323 and 324) which is forwarded to a runtime application 395. The pre-compile optimizer is also used to create impact graph 370 which advantageously tracks associations between source code files 311, 312, 313 and 314 (e.g., tracks which file includes values that are used by another file, which files includes instructions that impact operations or instructions of another file, etc.).

The update primary file set 330 includes source code file 331 which includes changes or updates for the application. In one exemplary implementation, the changes in initial patch file 331 directly correspond to source code file 312 and source code file 312 is a "replacement" for the source code 312. While, the source code file 331 is included in the update primary files 330, and does directly correspond to original source code file 312, it is noted the source code file 331 does not necessarily directly correspond to the "replacement" source code file 391 included in the hot patch file 390, as will be further explained in subsequent portions of the detailed description. It is appreciated, in another exemplary implementation, the update primary file set includes more than a single initial patch file 331.

A query asking which files in the original source code files are indirectly associated with the initial patch file 331 is forwarded to impact graph 370. As described previously, the impact graph 370 tracks associations between the original application files. This includes tracking the indirect association of the source code file 312 to the other source code files 311, 313 and 314.

In one exemplary implementation, the impact graph 370 identifies source code file 312 as being associated with source code file 314 and since source code file 312 directly corresponds to initial patch file 331, the impact graph 370 indicates source code file 314 is associated with initial patch file 331. Source code 331 is accessed and included in update secondary set 340 as source code file 341. It is appreciated other source code files included in initial file set 310 can be associated with other initial patch files (not shown). The initial patch file 331 from update primary file set 330 and source code file 341 from update secondary file set 340 are optimized by pre-compiler optimizer 322, which outputs the updated pre-optimized file set 350 (e.g., including source code files 351, and 352).

The initial pre-optimized file set 320 (e.g., including source code files 321, 322, 323 and 324) and updated pre-optimized file set 350 (e.g., including source code files 351, and 352) are forwarded to comparator 383 which determines which of the source code files included in the updated pre-optimized file set 380 are different from the source code files of the initial pre-optimized file set 320. The resulting different source code file 391 is included in hot patch file set 390. The hot patch file set 390 is forwarded to application 340. In one exemplary implementation, the initial pre-optimized files 320 are used to run the application and, at a later time, the hot patch file set 390 is forwarded to the application 395 and used to update the application without stopping the application.

In one embodiment, the pre-compile optimization 381 performed in the top half of FIG. 4 is a global optimization of files included in the initial file set 310 (e.g., similar to conventional global approach). The pre-compile optimization 382 performed in the bottom half of FIG. 4 is a combined optimization of source code files in the primary update file set and the update secondary file set that avoids re-optimization of the other source code files in the initial file set 310. The source files included in the initial file set 310 can be dynamic scripting language based application files.

Figure 5:
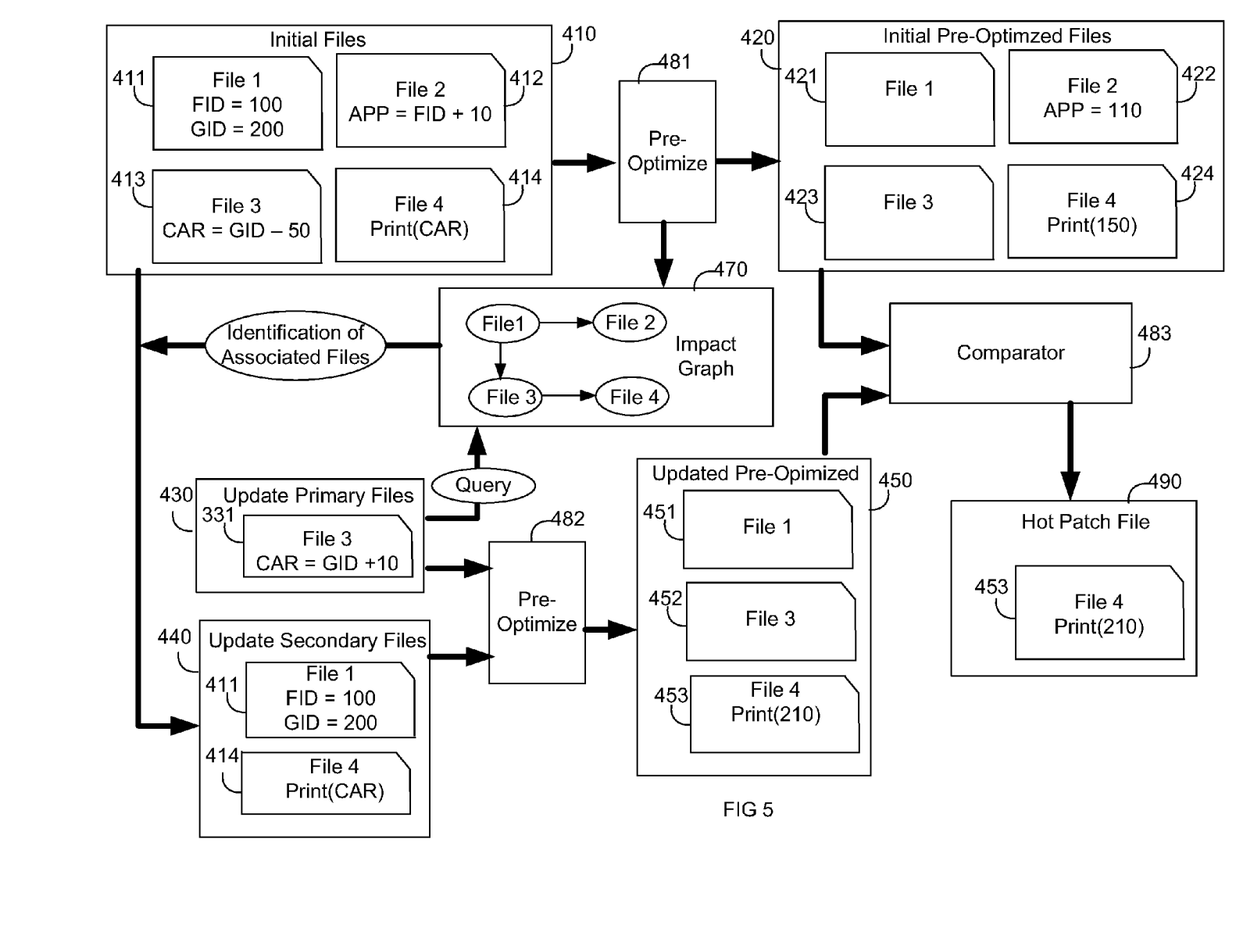
FIG. 5 is a block diagram of an exemplary update implementation in accordance with one embodiment of the present invention.

FIG. 5 is a block diagram of an exemplary update implementation in accordance with one embodiment of the present invention.

The initial file set 410 includes four source code files 411, 412, 413, and 414 which are input to pre-optimizer 481, which in turn outputs the initial pre-optimized file set 420. The FID and GID variable definitions in source code file 411 and the CAR=GID−50 instruction included in source code file 413 are not used any more in the initial pre-optimized file set 420, and as a result, these statements are removed from source code files 421 and 423. Pre-optimizer 481 also generates the impact graph 470. The initial patch file 221 is used to query the impact graph 470 which indicates source code files 411 and 414 are indirectly associated with source code file 413. Source code files 331, 411 and 414 are optimized resulting in updated pre-optimized set 450 (including source code files 451, 452, and 453). Source code files in the initial pre-optimized files set 420 and the updated pre-optimized file set 450 are compared by comparator 483 and source code files identified as being different are included in the hot patch file 490 (e.g., source code file 491). After the comparison, only source code file 424 ("File4") is changed, and the final hot patch file is the new source code file 453 (new "File4"). Lastly, the hot patch file set is applied to the runtime application.

Figure 6:
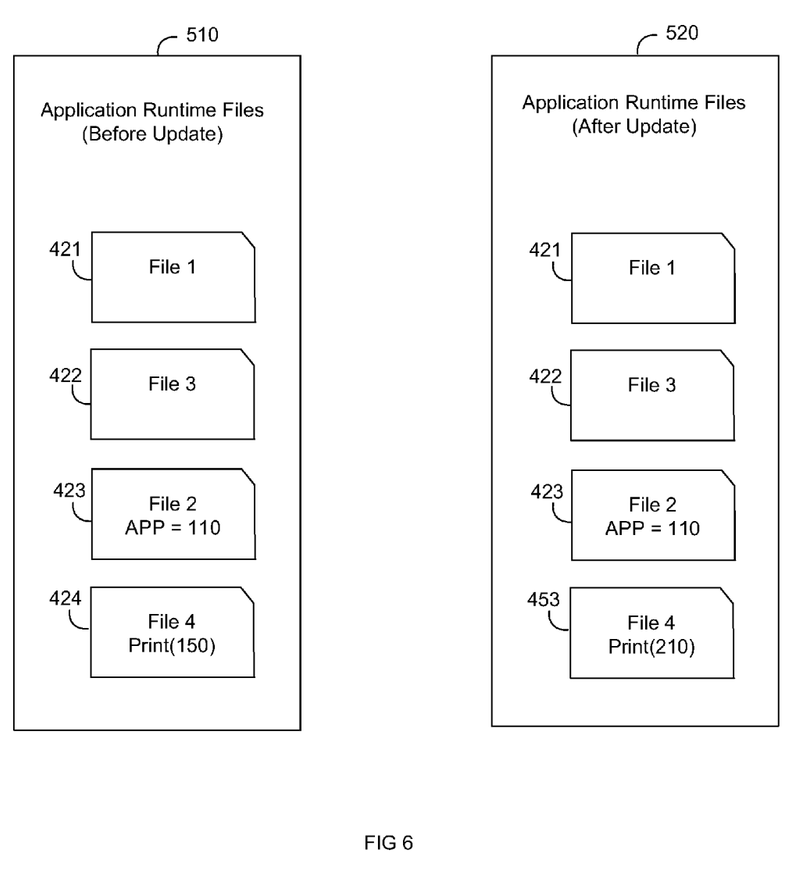
FIG. 6 is a block diagram of an exemplary runtime source code files in accordance with one embodiment of the present invention.

FIG. 6 is a block diagram of an exemplary implementation of runtime source code files in accordance with one embodiment of the present invention. Application runtime files 510, before an update, include source code files 421, 422, 423, and 424. Application runtime files 520, after an update, include source code files 421, 422, 423, and 453. The source code file 424 with instruction PRINT(150) is replaced with a hot patch file including source code file 453 PRINT(210). A generated hot patch file may be different than the initial patch file. Simply applying the initial patch file 431 to a runtime application does not produce accurate and reliable results. If the initial patch file 431 was simply applied to the updated application runtime files 520, the patch file cannot find the GID definition (since it is no longer included in source code file 421) and the incorrect original value 150 would be printed out instead of the updated value 210.

Figure 7:
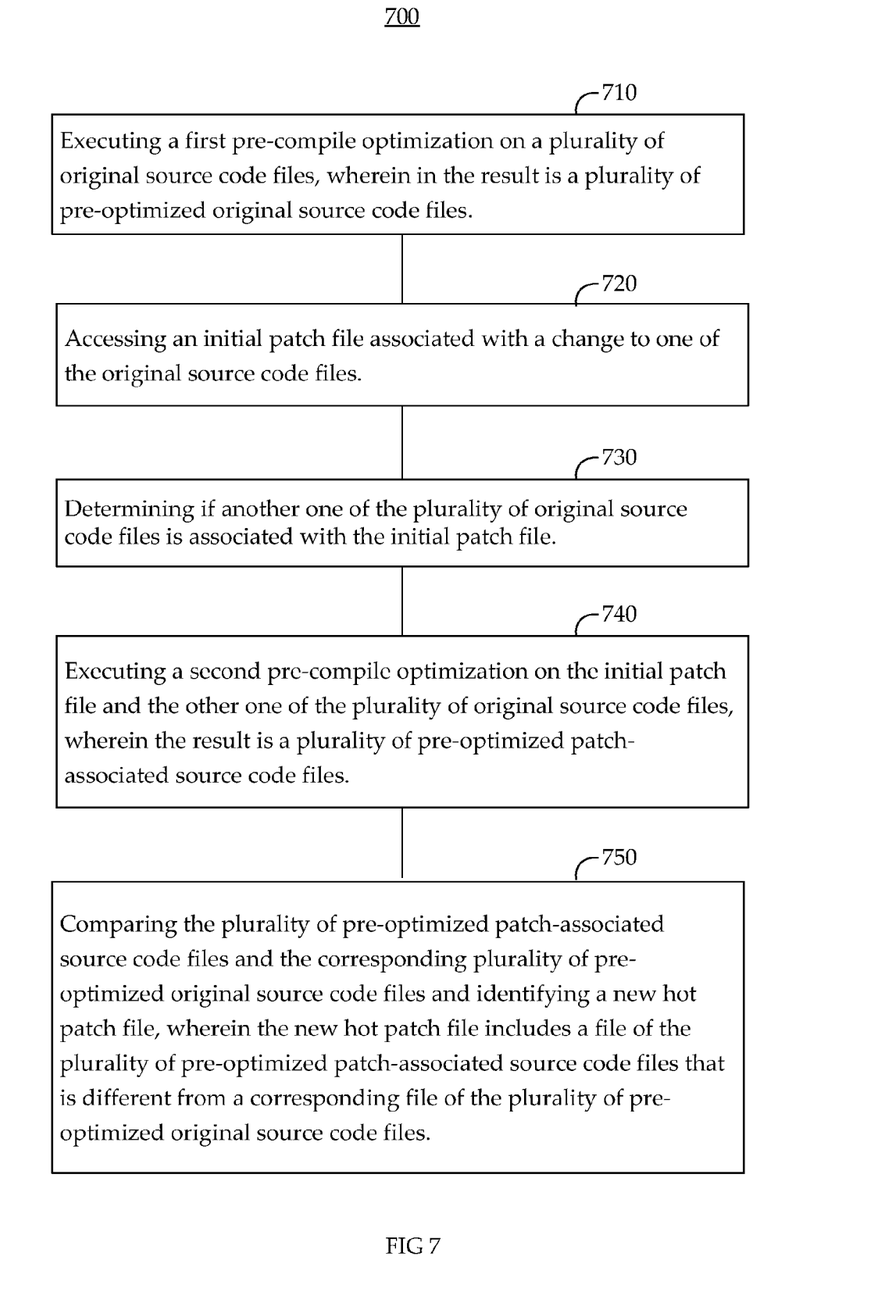
FIG. 7 is a flow chart of an exemplary method in accordance with one embodiment of the present invention.

FIG. 7 is a flow chart of exemplary method 700 in accordance with one embodiment of the present invention. The operations of method 700 can be performed by a processor of a computer system (e.g., similar to processing component 110, etc.)

In block 710, a first pre-compile optimization process is executed on a plurality of original source code files resulting in a plurality of pre-optimized original source code files.

In block 620, an initial patch file associated with a change to a first one of the plurality of original source code files is accessed.

In block 730, a determination is made if a second one of the plurality of original source code files is associated with the initial patch file. The second one of the plurality of original source code files is included in a set of impacted source code files if the second one of the plurality of original source code files is associated with the initial patch file. In one embodiment, the process for determining if another one of the plurality of original source code files is associated with the initial patch file includes: 10 creating an impact graph, wherein the impact graph includes associations of the plurality of original source code files to one another; and 2) querying the impact graph to identify which ones of the plurality of original source code files are associated with a patch source code file.

In block 740, a second pre-compile optimization is executed on the initial patch file and the set of impacted source code files, wherein the result is a plurality of patch-associated source code files that are pre-optimized.

In block 750, the plurality of pre-optimized patch-associated source code files is compared to a corresponding plurality of pre-optimized original source code files. The results of the comparison are used to identify source code files for inclusion in a new hot patch file. The new hot patch file includes one of the plurality of pre-optimized patch source code files that is different from a corresponding one of the plurality of pre-optimized original source code files. The hot patch file and the initial patch file are different. There are less pre-optimized patch-associated source code files than pre-optimized original source code files.

In one embodiment, a portion of the plurality of original source files are included in a dynamic module and a patch file is associated with the dynamic module.

The novel maintenance and updating approach is used to reduce patching efforts in a system that uses several dynamic modules that are pre-compiled from source files. The modules are written with dynamic or static languages, and the modules support dynamic replacement. If there is a bug fix in the source file, the dynamic module required is identified and replaced at the dynamic module level. The dynamic module supports dynamic replacement and the dynamic module is replaced in a hot patch operation.

In one embodiment, additional optimizations are implemented. The impact graph's edge source is a file and the granularity is reduced to the statement level (or to the compiler abstract syntax tree node level). In the patching process, the changed statements in the patch files are identified and used to query the impact graph. This optimization can further reduce the scope of the query results, and reduce pre-optimization and patching time.

With respect to updating or patching of conventional static language based applications, the novel embodiments described herein are different in both the system structure and the patching process. In the patching system structure side, the novel processes introduce an impact graph, unlike conventional static language. In the process side, there are additional steps relating to impact graph querying and pre-compile result comparisons. These two steps facilitate reducing pre-compilation efforts in the patching process, and also facilitate reduction of patching workloads.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A device comprising:
a processor configured to perform operations of:
executing a first pre-compile optimization on a plurality of original source code files stored in a memory of the device resulting in a plurality of pre-optimized original source code files;
accessing an initial patch file associated with a change to a first one of the plurality of original source code files;
determining if a second file of the plurality of original source code files is associated with the initial patch file, wherein the second file is included in a set of impacted source code files if the second file is associated with the initial patch file;

executing a second pre-compile optimization on the initial patch file and the set of impacted source code files, wherein the result is a plurality of pre-optimized patch-associated source code files; and comparing the plurality of pre-optimized patch-associated source code files and corresponding plurality of pre-optimized original source code files and identifying a new hot patch file, wherein the new hot patch file includes a file of the plurality of pre-optimized patch-associated source code files that is different from a corresponding file of the plurality of pre-optimized original source code files.

2. A method comprising:

executing in a processor, a first pre-compile optimization on a plurality of original source code files resulting in a plurality of pre-optimized original source code files;

accessing an initial patch file associated with a change to a first one of the plurality of original source code files;

determining, by the processor, if a second file of the plurality of original source code files is associated with the initial patch file, wherein the second file is included in a set of impacted source code files if the second file is associated with the initial patch file;

executing a second pre-compile optimization on the initial patch file and the set of impacted source code files, wherein the result is a plurality of pre-optimized patch-associated source code files; and comparing, by the processor, the plurality of pre-optimized patch-associated source code files and corresponding plurality of pre-optimized original source code files and identifying a new hot patch file, wherein the new hot patch file includes a file of the plurality of pre-optimized patch-associated source code files that is different from a corresponding file of the plurality of pre-optimized original source code files.

3. The method of claim 2, wherein there are less pre-optimized patch associated source code files than pre-optimized original source code files.

4. The method of claim 2, wherein the hot patch file and the initial patch file are different.

5. The method of claim 2, wherein the determining includes:

creating an impact graph, wherein the impact graph includes associations of the plurality of original source code files to one another; and querying the impact graph to identify which ones of the plurality of original source code files are associated with the initial patch file.

6. The method of claim 5, wherein the impact graph includes a plurality of nodes corresponding to the plurality of original source code files and an edge of the graph represents an optimization impact, starting from a data source of the optimization and ending at an optimized file.

7. The method of claim 2, wherein a portion of the plurality of original source files are included in a dynamic module and the initial patch file is associated with the dynamic module.

8. The method of claim 7, wherein the dynamic module supports dynamic replacement and the dynamic module is replaced in a hot patch operation.

\* \* \* \* \*

UNITED STATES PATENT AND TRADEMARK OFFICE
CERTIFICATE OF CORRECTION

PATENT NO. : 9,569,199 B2  
APPLICATION NO. : 14/603136  
DATED : February 14, 2017  
INVENTOR(S) : Wang et al.

Page 1 of 1

It is certified that error appears in the above-identified patent and that said Letters Patent is hereby corrected as shown below:

In Column 4, Line 66, delete "120" and insert --110-- therefor

In Column 9, Line 33, delete "620," and insert --720,-- therefor

Signed and Sealed this  
Tenth Day of April, 2018

Andrei Iancu  
*Director of the United States Patent and Trademark Office*